US009689351B2

(12) United States Patent
Ono

(10) Patent No.: US 9,689,351 B2
(45) Date of Patent: Jun. 27, 2017

(54) FUEL VAPOR TREATMENT APPARATUS

(71) Applicant: FUJI JUKOGYO KABUSHIKI KAISHA, Tokyo (JP)

(72) Inventor: Masahiro Ono, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/063,180

(22) Filed: Mar. 7, 2016

(65) Prior Publication Data

US 2016/0273493 A1    Sep. 22, 2016

(30) Foreign Application Priority Data

Mar. 18, 2015  (JP) ................................. 2015-054798

(51) Int. Cl.
*F02M 25/08*        (2006.01)
*F02B 37/00*        (2006.01)

(52) U.S. Cl.
CPC ......... *F02M 25/0809* (2013.01); *F02B 37/00* (2013.01); *F02M 25/0818* (2013.01); *F02M 25/0836* (2013.01)

(58) Field of Classification Search
CPC .......... F02M 25/08–25/089; F02M 2025/0845
USPC ............ 123/518–521, 559.1–566; 73/114.39
See application file for complete search history.

(56) References Cited

U.S. PATENT DOCUMENTS 8,843,265 B2 *  9/2014  Sager .................. F02B 29/0406
                                                123/520
9,163,590 B2 *  10/2015 Takeishi ............. F02M 25/0809
9,176,022 B2 *  11/2015 Jackson ................ G01M 15/09
2006/0272400 A1 * 12/2006 Wakahara .......... F02M 25/0809
                                                73/114.37

FOREIGN PATENT DOCUMENTS

| JP | 2004-245112 A | 9/2004 |
| JP | 2004-301027 A | 10/2004 |
| JP | 2005-256624 A | 9/2005 |

(Continued)

OTHER PUBLICATIONS

Office Action received for Japanese Patent Application No. 2015-054798, mailed on May 17, 2016, 6 pages of office action including 4 pages of English translation.

*Primary Examiner* — Erick Solis
*Assistant Examiner* — Robert Werner
(74) *Attorney, Agent, or Firm* — Chip Law Group

(57) ABSTRACT

A fuel vapor treatment apparatus of a vehicle in which a supercharger that supercharges intake air is provided at an intake passage of an internal combustion engine includes a pump controller that drives a pump, a gas passage pressure detector that is provided between a canister and the pump in a gas passage and detects pressure of the gas passage, and an abnormality determining module that determines whether an upstream-side purge passage has an abnormality, on the basis of the pressure detected by the gas passage pressure detector. The pump controller drives the pump when an upstream-side valve is in an opened state. The abnormality determining module determines whether the upstream-side purge passage has an abnormality, on the basis of the pressure detected by the gas passage pressure detector after the upstream-side valve enters the opened state and the pump is driven.

2 Claims, 9 Drawing Sheets

(56) References Cited

FOREIGN PATENT DOCUMENTS

| | | | |
|---|---|---|---|
| JP | 2006-257937 | A | 9/2006 |
| JP | 2006-336553 | A | 12/2006 |
| JP | 2008-095564 | A | 4/2008 |
| JP | 2013-160108 | A | 8/2013 |

* cited by examiner

FUEL VAPOR TREATMENT APPARATUS

CROSS-REFERENCE TO RELATED APPLICATIONS

The present application claims priority from Japanese Patent Application No. 2015-054798 filed on Mar. 18, 2015, the entire contents of which are hereby incorporated by reference.

BACKGROUND

1. Technical Field

The present invention relates to a fuel vapor treatment apparatus that treats fuel vapor generated in a fuel tank.

2. Related Art

Fuel vapor generated in a fuel tank contains hydrocarbon (HC), and is a cause of photochemical smog. Hence, vehicles are provided with a fuel vapor treatment apparatus that causes fuel vapor generated in a fuel tank to be once adsorbed onto activated carbon in a canister and causes the fuel vapor to be desorbed (purged) from the activated carbon and supplied to an engine during an engine operation.

As conventional fuel vapor treatment apparatuses, for example, Japanese Unexamined Patent Application Publication (JP-A) No. 2004-245112 discloses a technology of determining whether a fuel tank has an abnormality (leak), by providing a pump that puts the fuel tank under negative pressure, and driving the pump and detecting a change in the pressure in the fuel tank when an engine is stopped. For example, JP-A No. 2005-256624 also discloses a technology of determining whether a purge flow has an abnormality, by controlling the working of a shut-off valve disposed at a vapor passage that provides communication between the fuel tank and the canister.

Furthermore, for example, JP-A No. 2013-160108 discloses a technology of providing a vehicle equipped with a supercharger at an intake passage of an engine with a downstream-side purge passage and an upstream-side purge passage that respectively provide communication between the canister and the downstream side and the upstream side of the supercharger in the intake passage, respectively providing a downstream-side valve and an upstream-side valve at the down-side purge passage and the upstream-side purge passage, and determining whether the downstream-side valve and the upstream-side valve have an opening and closing abnormality, on the basis of the pressure closer to the canister side than the downstream-side valve and the upstream-side valve.

However, the technology of JP-A No. 2013-160108 has a problem that, although it is possible to determine whether the downstream-side valve and the upstream-side valve have an opening and closing abnormality, it is not possible to determine whether the entire upstream-side purge passage has an abnormality.

SUMMARY OF THE INVENTION

Thus, the present invention provides a fuel vapor treatment apparatus that can detect an abnormality of an upstream-side purge passage that provides communication between the upstream side of a supercharger in an intake passage and a canister.

To solve the above-described problem, a fuel vapor treatment apparatus of a vehicle according to the present invention, in which a supercharger that supercharges an intake air is provided at an intake passage of an internal combustion engine, includes: a canister that communicates with a fuel tank via a vapor passage and causes a fuel vapor generated from the fuel tank to be adsorbed; an upstream-side purge passage that provides a communication between an upstream-side intake passage on an upstream side of the supercharger in the intake passage and the canister; an upstream-side valve that is provided at the upstream-side purge passage, enters an opened state for allowing the upstream-side purge passage to communicate when a pressure in the upstream-side intake passage becomes a negative pressure, and enters a closed state for closing the upstream-side purge passage when the pressure in the upstream-side intake passage becomes a positive pressure; a gas passage one end of which is opened to an atmosphere and another end of which is connected with the canister; a pump that is provided at the gas passage and takes in an air on a side of the canister in the gas passage; a pump controller that drives the pump; a gas passage pressure detector that is provided between the canister and the pump in the gas passage and detects a pressure in the gas passage; and an abnormality determining module that determines whether the upstream-side purge passage has an abnormality, on the basis of the pressure detected by the gas passage pressure detector. The pump controller drives the pump when the upstream-side valve is in the opened state. The abnormality determining module determines whether the upstream-side purge passage has an abnormality, on the basis of the pressure detected by the gas passage pressure detector after the upstream-side valve enters the opened state and the pump is driven.

The fuel vapor treatment apparatus may further include: a downstream-side purge passage that provides a communication between a downstream-side intake passage on a downstream side of the supercharger in the intake passage and the canister; and a downstream-side valve that is provided at the downstream-side purge passage, enters an opened state for allowing the downstream-side purge passage to communicate when a pressure in the downstream-side intake passage becomes a negative pressure, and enters a closed state for closing the downstream-side purge passage when the pressure in the downstream-side intake passage becomes a positive pressure. The abnormality determining module may determine whether the downstream-side purge passage has an abnormality, on the basis of the pressure detected by the gas passage pressure detector when the downstream-side valve enters the opened state and the pump remains undriven.

The pump may be a vane pump in which a rotor is provided eccentrically with respect to a cam ring, a vane that is provided slidably in a trench formed on the rotor protrudes due to a centrifugal force caused by a rotation of the rotor, and the rotor is rotated in contact with an inner side surface of the cam ring. The pump controller may rotate the rotor at least until the vane comes into contact with the inner side surface of the cam ring when the abnormality determining module determines that the upstream-side purge passage has an abnormality or before the abnormality determining module determines that the upstream-side purge passage has an abnormality, after the upstream-side valve enters the opened state. The abnormality determining module may determine whether the upstream-side purge passage has an abnormality, on the basis of the pressure detected by the gas passage pressure detector after the upstream-side valve enters the opened state and the rotor is rotated at least until the vane comes into contact with the inner side surface of the cam ring.

DETAILED DESCRIPTION

Figure 1:
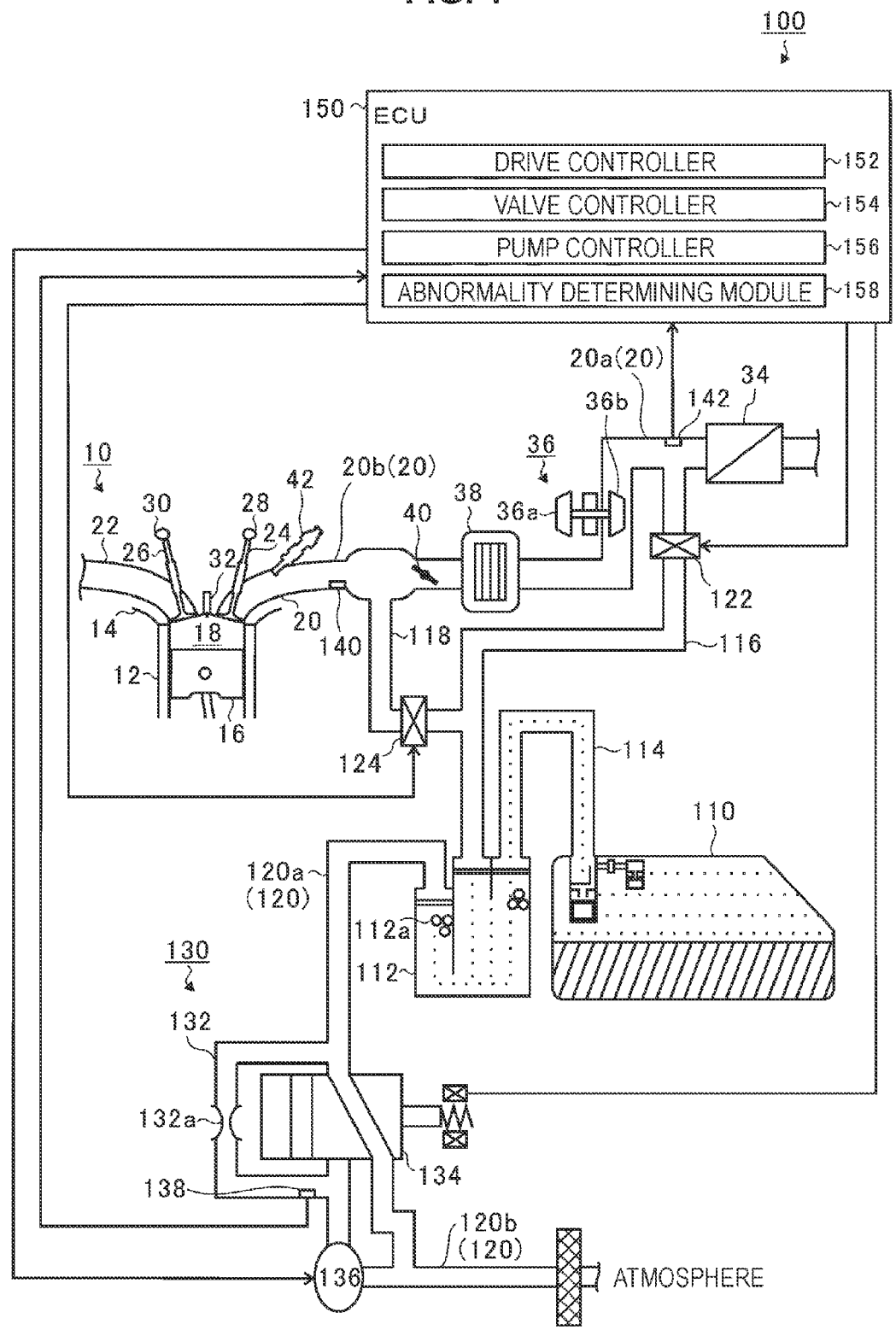
FIG. 1 schematically illustrates configurations of an engine and a fuel vapor treatment apparatus.

Hereinafter, a preferred implementation of the present invention will be described in detail with reference to the appended drawings. The dimensions, materials, other specific numerical values, etc. illustrated in the implementation are only examples for ease of the understanding of the invention, and do not limit the present invention unless otherwise stated. Note that, in this specification and the appended drawings, structural elements that have substantially the same function and structure are denoted with the same reference numerals and repeated description of these structural elements is omitted, and the illustration of structural elements that have no direct relation to the present invention is omitted.

FIG. 1 schematically illustrates the configurations of an engine 10 and a fuel vapor treatment apparatus 100. In FIG. 1, the flow of a signal is illustrated by the solid arrow, and fuel vapor is illustrated by the dotted line. However, in the following, configurations and processing related to the implementation are described in detail, and configurations and processing unrelated to the implementation are not described.

As illustrated in FIG. 1, the engine (internal combustion engine) 10 includes a cylinder block 12, a cylinder head 14 provided on the top of the cylinder block 12, and a piston 16 slidably supported by a piston rod in the cylinder block 12. The space surrounded by the cylinder block 12, the cylinder head 14, and the upper surface of the piston 16 serves as a combustion chamber 18.

An intake passage 20 including an intake manifold and an exhaust passage 22 including an exhaust manifold are connected with the cylinder head 14, and the cylinder head 14 provides communication between the combustion chamber 18 and the intake passage 20 and provides communication between the combustion chamber 18 and the exhaust passage 22. An end of an intake valve 24 is positioned between the intake passage 20 and the combustion chamber 18, and an end of an exhaust valve 26 is positioned between the exhaust passage 22 and the combustion chamber 18. An intake valve cam 28 is in contact with the other end of the intake valve 24, and the portion between the intake passage 20 and the combustion chamber 18 is opened and closed by the rotation of the intake valve cam 28. An exhaust valve cam 30 is in contact with the other end of the exhaust valve 26, and the portion between the exhaust passage 22 and the combustion chamber 18 is opened and closed by the rotation of the exhaust valve cam 30. The opening and closing operations by the intake valve 24 and the exhaust valve 26 are controlled as appropriate by a drive controller 152 described later.

An air cleaner 34, a supercharger 36, an intercooler 38, a throttle valve 40, and an injector 42 are provided in the intake passage 20 in this order from the upstream side (atmosphere side) toward the downstream side (engine side) of the intake passage 20. In the following, the upstream side of a compressor 36b (supercharger 36) in the intake passage 20 is referred to as an upstream-side intake passage 20a, and the downstream side of the compressor 36b (supercharger 36) in the intake passage 20 is referred to as a downstream-side intake passage 20b.

The air cleaner 34 removes impurities mixed with the air that is taken in from the outside air. The air from which impurities have been removed by the air cleaner 34 is guided to the supercharger 36, which supercharges the intake air.

The supercharger 36 includes a turbine 36a provided in the exhaust passage 22 and rotated by the exhaust gas from the engine 10, and a compressor 36b provided in the intake passage 20 and rotated by the rotational power of the turbine 36a. The compressor 36b increases the pressure of the air (compresses the air) taken in via the air cleaner 34, and sends out the pressure-increased air to the downstream side (engine 10). The supercharger 36 is driven and stopped on the basis of the control of an ECU 150.

The intercooler 38 cools the air whose temperature has been increased due to the pressure increased by the supercharger 36.

The throttle valve 40 is opened and closed by an actuator in accordance with the degree of opening of an accelerator (not illustrated), and adjusts the amount of air sent out to the engine 10.

The injector 42 is disposed so as to be directed to the combustion chamber 18, and jets the fuel in the fuel tank 110 in accordance with the rotation angle of a crankshaft (not illustrated). This guides mixed gas in which the fuel jetted by the injector 42 and the air that has passed through the throttle valve 40 are mixed together to the combustion chamber 18.

The fuel (mixed gas) guided to the combustion chamber 18 is ignited and combusted at a prescribed timing by a spark plug 32 disposed such that its tip is positioned in the combustion chamber 18. The combustion reciprocates the piston 16, and the reciprocating motion is converted to the rotational motion of the crankshaft via the piston rod.

The engine 10 driven in this way is equipped with a fuel vapor treatment apparatus 100, which supplies fuel vapor generated in the fuel tank 110 to the combustion chamber 18. The fuel vapor treatment apparatus 100 includes the fuel tank 110, a canister 112, a vapor passage 114, an upstream-side purge passage 116, a downstream-side purge passage 118, a gas passage 120, an upstream-side valve 122, a downstream-side valve 124, an evaporative leak check module (ELCM) 130, and an engine control unit (ECU) 150.

The fuel vapor treatment apparatus 100 has the fuel tank 110 and the canister 112 communicate with each other via the vapor passage 114. The fuel vapor treatment apparatus 100 has the canister 112 and the upstream-side intake passage 20a communicate with each other via the upstream-side purge passage 116, and the canister 112 and the downstream-side intake passage 20b communicate with each other via the downstream-side purge passage 118. In the fuel vapor treatment apparatus 100, one end of the gas passage 120, the other end of which is opened to the atmosphere, is connected with the canister 112. Although the upstream-side purge passage 116 and the downstream-side purge passage 118 are shared in part in the implementation, the upstream-side purge passage 116 and the downstream-side purge passage 118 may be provided independently.

The interior of the canister 112 is charged with activated carbon 112a; and when fuel vapor generated in the fuel tank 110 flows into the canister 112 via the vapor passage 114, the fuel vapor is adsorbed onto the activated carbon 112a charged in the interior. The adsorbed fuel vapor is desorbed (purged) from the activated carbon 112a by air flowing into the canister 112, as described later in detail.

The upstream-side purge passage 116 is provided with the upstream-side valve 122, which opens and closes the upstream-side purge passage 116. The upstream-side valve 122 in an opened state allows the upstream-side purge passage 116 to communicate; and the upstream-side valve 122 in a closed state closes the upstream-side purge passage 116. The downstream-side purge passage 118 is provided with the downstream-side valve 124, which opens and closes the downstream-side purge passage 118. The downstream-side valve 124 in the opened state allows the downstream-side purge passage 118 to communicate; and the downstream-side valve 124 in the closed state closes the downstream-side purge passage 118.

The fuel vapor treatment apparatus 100 is provided with the ELCM 130 at an intermediate position of the gas passage 120, the ELCM 130 being used to determine whether a purge flow such as a passage through which fuel vapor passes has an abnormality. The ELCM 130 includes a bypass passage 132, a switching valve 134, a pump 136, and a first pressure sensor (gas passage pressure detector) 138. In the following, the passage closer to the side of the canister 112 than the switching valve 134 in the gas passage 120 is referred to as a canister-side gas passage 120a, and the passage closer to the atmosphere side than the switching valve 134 in the gas passage 120 is referred to as an atmosphere-side gas passage 120b.

The bypass passage 132 provides communication between the canister-side gas passage 120a and the atmosphere-side gas passage 120b so as to detour around the switching valve 134. That is, the bypass passage 132 serves as the gas passage 120, which detours around the switching valve 134. The bypass passage 132 is provided with an orifice 132a.

The switching valve 134 can switch between an OFF state for allowing the canister-side gas passage 120a and the atmosphere-side gas passage 120b to communicate with each other and an ON state for allowing the canister-side gas passage 120a, the orifice 132a in the bypass passage 132, and the pump 136 to communicate with each other.

The pump 136 is closer to the atmosphere side than the orifice 132a and the switching valve 134 in the bypass passage 132, and is driven to take in the air on the side of the canister 112 in the bypass passage 132 and discharge the air to the atmosphere side.

Figure 2:
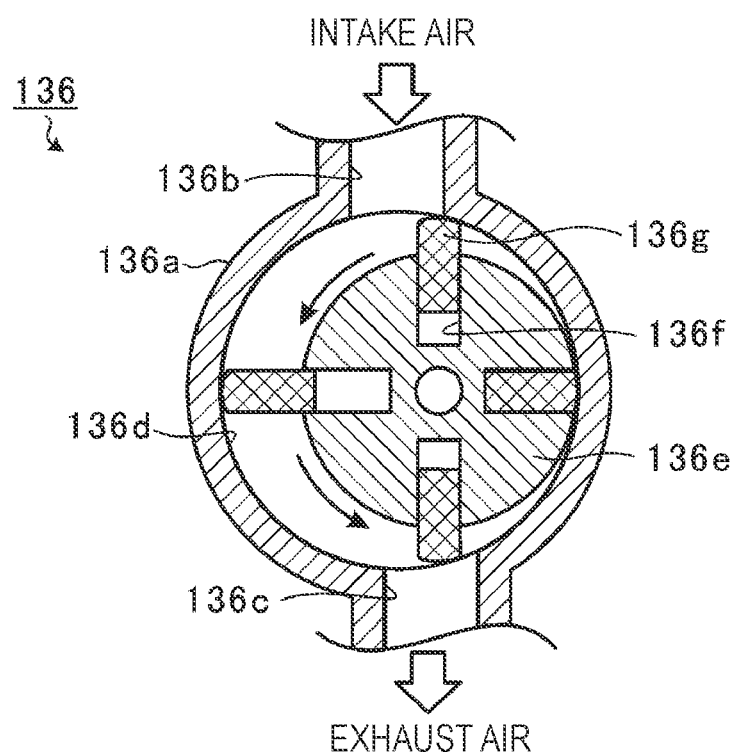
FIG. 2 is a schematic cross-sectional view describing a pump.

FIG. 2 is a schematic cross-sectional view describing the pump 136. As illustrated in FIG. 2, a vane pump that includes a cam ring 136a, a rotor 136e, and vanes 136g is used as the pump 136. In FIG. 2, the rotation direction of the rotor 136e is illustrated by the solid arrow, and the intake direction and the exhaust direction are illustrated by the hollow arrows.

The cam ring 136a has a substantially bottomed circular cylindrical shape. The rotor 136e having a thickness substantially equal to the thickness of the internal space and the vanes 136g are provided in the internal space defined by a cover (not illustrated) that closes the opening. The cam ring 136a includes an intake port 136b, which provides communication between the internal space and the bypass passage 132, and an exhaust port 136c, which provides communication between the internal space and the atmosphere-side gas passage 120b. The intake port 136b and the exhaust port 136c substantially face each other on the side surface of the cam ring 136a.

The rotor 136e has a substantially circular columnar shape, is provided eccentrically with respect to the cam ring 136a, and is rotated by a motor (not illustrated). The rotor 136e radially has (e.g. four) trenches 136f, and the vane 136g is slidably provided in each trench 136f.

When the rotor 136e is rotated, the vane 136g protrudes up to contact with the inner side surface 136d of the cam ring 136a due to centrifugal force; and during the rotation of the rotor 136e, the vane 136g remains in contact with the inner side surface 136d and is rotated together with the rotor 136e.

When the pump 136 is driven, the air that has flowed into the internal space of the cam ring 136a from the intake port 136b is confined and compressed in the space surrounded by the two vanes 136g, the rotor 136e, and the inner side surface 136d, and is then released to the atmosphere-side gas passage 120b from the exhaust port 136c.

Returning to FIG. 1, the first pressure sensor 138 is provided between the orifice 132a in the bypass passage 132 and the pump 136, and detects the pressure in the bypass passage 132 (gas passage 120). A second pressure sensor 140 is provided between the throttle valve 40 in the downstream-side intake passage 20b and the injector 42, and detects the pressure in the downstream-side intake passage 20b.

In the fuel vapor treatment apparatus 100, a flowmeter 142 is provided in the upstream-side intake passage 20a, and the flowmeter 142 detects the amount of air supplied to the combustion chamber 18 of the engine 10 (taken into the supercharger 36).

The ECU 150 includes a microcomputer that includes a central processing unit (CPU), ROM in which a program, etc. are stored, RAM serving as a work area, etc., and integrally controls the engine 10 and the fuel vapor treatment apparatus 100. In the implementation, the ECU 150 serves as the drive controller 152, a valve controller 154, a pump controller 156, and an abnormality determining module 158.

The drive controller 152 timely controls the supercharger 36, the throttle valve 40, the injector 42, etc. to drive the engine 10. When the engine 10 is under low load, the drive controller 152 stops the supercharger 36; and when the engine 10 is under high load, the drive controller 152 drives the supercharger 36 to increase the amount of air supplied to the engine 10. Furthermore, the drive controller 152 performs control to open and close the throttle valve 40 via the actuator in accordance with the degree of opening of the accelerator. Furthermore, the drive controller 152 causes the injector 42 to jet fuel in accordance with the rotation angle of the crankshaft.

The valve controller 154 performs control to open and close the upstream-side valve 122 and the downstream-side valve 124, and switches the switching valve 134 between the ON state and the OFF state. Here, when the supercharger 36 is stopped, air is drawn into the combustion chamber 18 from the intake passage 20 (downstream-side intake passage 20b) by the sliding piston 16, and the pressure in the intake passage 20 becomes negative pressure. In particular, the pressure in the downstream-side intake passage 20b near the combustion chamber 18 becomes low (e.g. −500 mmHg). Hence, when the pressure detected by the second pressure sensor 140 becomes negative pressure, or when the pressure in the downstream-side intake passage 20b becomes negative pressure, the valve controller 154 sets the downstream-side valve 124 in the opened state, sets the upstream-side valve 122 in the closed state, and sets the switching valve 134 in the OFF state. Thereby, due to the negative pressure in the downstream-side intake passage 20b, air is drawn into the downstream-side intake passage 20b via the gas passage 120, the canister 112, and the downstream-side purge passage 118, and the fuel vapor adsorbed on the activated carbon 112a of the canister 112 is purged and supplied to the engine 10.

When the supercharger 36 is driven, air is sent from the supercharger 36 to the downstream-side intake passage 20b with the pressure increased; thus, the pressure in the downstream-side intake passage 20b becomes positive pressure. Meanwhile, the air in the upstream-side intake passage 20a is drawn into the supercharger 36; thus, the pressure in the upstream-side intake passage 20a becomes lower (e.g. −7 mmHg) than when the supercharger 36 is stopped. Hence, when the pressure detected by the second pressure sensor 140 becomes positive pressure, or when the downstream-side intake passage 20b has positive pressure, the valve controller 154 sets the upstream-side valve 122 in the opened state, and sets the downstream-side valve 124 in the closed state. Furthermore, the valve controller 154 sets the switching valve 134 in the OFF state. Thereby, due to the negative pressure in the upstream-side intake passage 20a, air is drawn into the upstream-side intake passage 20a via the gas passage 120, the canister 112, and the upstream-side purge passage 116, and the fuel vapor adsorbed on the activated carbon 112a of the canister 112 is purged and supplied to the engine 10.

In this way, when the engine 10 is driven, one of the upstream-side valve 122 and the downstream-side valve 124 is set in the opened state, and the other is set in the closed state in the fuel vapor treatment apparatus 100. Then, the fuel vapor adsorbed on the activated carbon 112a of the canister 112 is supplied to the engine 10 via the upstream-side purge passage 116 or the downstream-side purge passage 118.

In the fuel vapor treatment apparatus 100, fuel vapor is supplied to the engine 10, and it is determined whether the purge flow for supplying fuel vapor to the engine 10 has an abnormality. Specifically, when the engine 10 is stopped, fuel tank abnormality determination processing is performed. When the engine 10 is driven and the supercharger 36 is stopped, downstream-side purge passage abnormality determination processing is performed; and when the engine 10 is driven and the supercharger 36 is driven, upstream-side purge passage abnormality determination processing is performed.

(Fuel Tank Abnormality Determination Processing)

Figure 3:
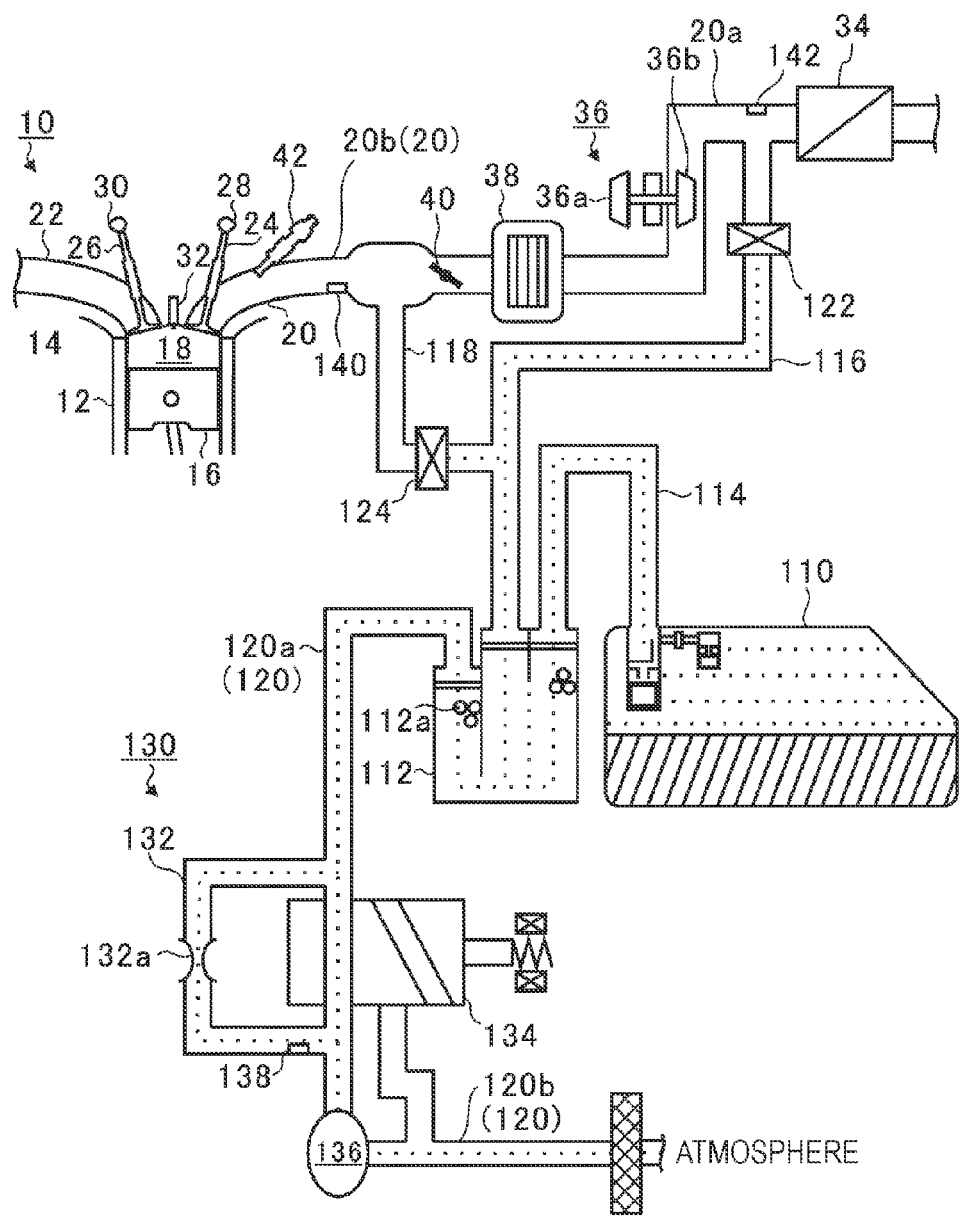
FIG. 3 describes fuel tank abnormality determination processing.

FIG. 3 describes fuel tank abnormality determination processing. The fuel tank abnormality determination processing is performed when the engine 10 is not driven by the drive controller 152, or when the engine 10 is stopped. As illustrated in FIG. 3, when fuel tank abnormality determination processing is performed, the valve controller 154 sets the upstream-side valve 122 and the downstream-side valve 124 in the closed state, and sets the switching valve 134 in the ON state.

Then, the pump controller 156 drives the pump 136. Thereby, the air in the fuel tank 110, the canister 112 and the vapor passage 114, the air closer to the side of the canister 112 than the upstream-side valve 122 in the upstream-side purge passage 116, the air closer to the side of the canister 112 than the downstream-side valve 124 in the downstream-side purge passage 118, and the air in the gas passage 120 and the bypass passage 132 (hereinafter, these are referred to as a fuel-tank-abnormality-determination-processing purge flow) are discharged to the atmosphere by the pump 136.

In the fuel vapor treatment apparatus 100, discharging the air in the fuel-tank-abnormality-determination-processing purge flow to the atmosphere with the pump 136 causes the pressure in the fuel tank 110 to be reduced when the fuel tank 110 has no abnormality (leak). Meanwhile, when the fuel-tank-abnormality-determination-processing purge flow has an abnormality, air flows in from the abnormal portion, and consequently the pressure in the fuel tank 110 is not reduced (or is difficult to reduce).

Thus, when the pressure detected by the first pressure sensor 138 becomes less than or equal to a prescribed fuel tank pressure threshold within a prescribed period, the abnormality determining module 158 determines that the fuel tank 110 has no abnormality; and when the pressure detected by the first pressure sensor 138 does not become less than or equal to the fuel tank pressure threshold within the prescribed period, the abnormality determining module 158 determines that the fuel tank 110 has an abnormality.

Next, when the fuel tank 110 is normal, the valve controller 154 changes the upstream-side valve 122 from the closed state to the opened state with the switching valve 134 in the ON state and the pump 136 driven. When the upstream-side purge passage 116 is normal, air then flows into the fuel-tank-abnormality-determination-processing purge flow, and the reduced pressure is increased. Meanwhile, when the upstream-side purge passage 116, for example, clogs up, the pressure in the fuel-tank-abnormality-determination-processing purge flow remains reduced.

Thus, when the amount of increased pressure (hereinafter, referred to as the pressure increase amount) becomes more than or equal to a prescribed pressure increase threshold within a prescribed period, the abnormality determining module 158 determines that the fuel-tank-abnormality-determination-processing purge flow has no abnormality. When the pressure increase amount remains less than the prescribed pressure increase threshold during the prescribed period, the abnormality determining module 158 determines that the fuel-tank-abnormality-determination-processing purge flow has an abnormality.

After that, the valve controller 154 sets the upstream-side valve 122 and the downstream-side valve 124 in the opened state, and sets the switching valve 134 in the OFF state. The pump controller 156 stops the pump 136. When the abnormality determining module 158 determines that the fuel tank 110 or the fuel-tank-abnormality-determination-processing purge flow has an abnormality, the abnormality determining module 158 reports, for example, on a display provided in a vehicle, that the fuel tank 110 or the fuel-tank-abnormality-determination-processing purge flow has an abnormality.

Although the fuel tank abnormality determination processing is performed mainly in order to detect an abnormality of the fuel tank 110, it is actually determined whether the entire fuel-tank-abnormality-determination-processing purge flow has an abnormality.

(Downstream-Side Purge Passage Abnormality Determination Processing)

Figure 4:
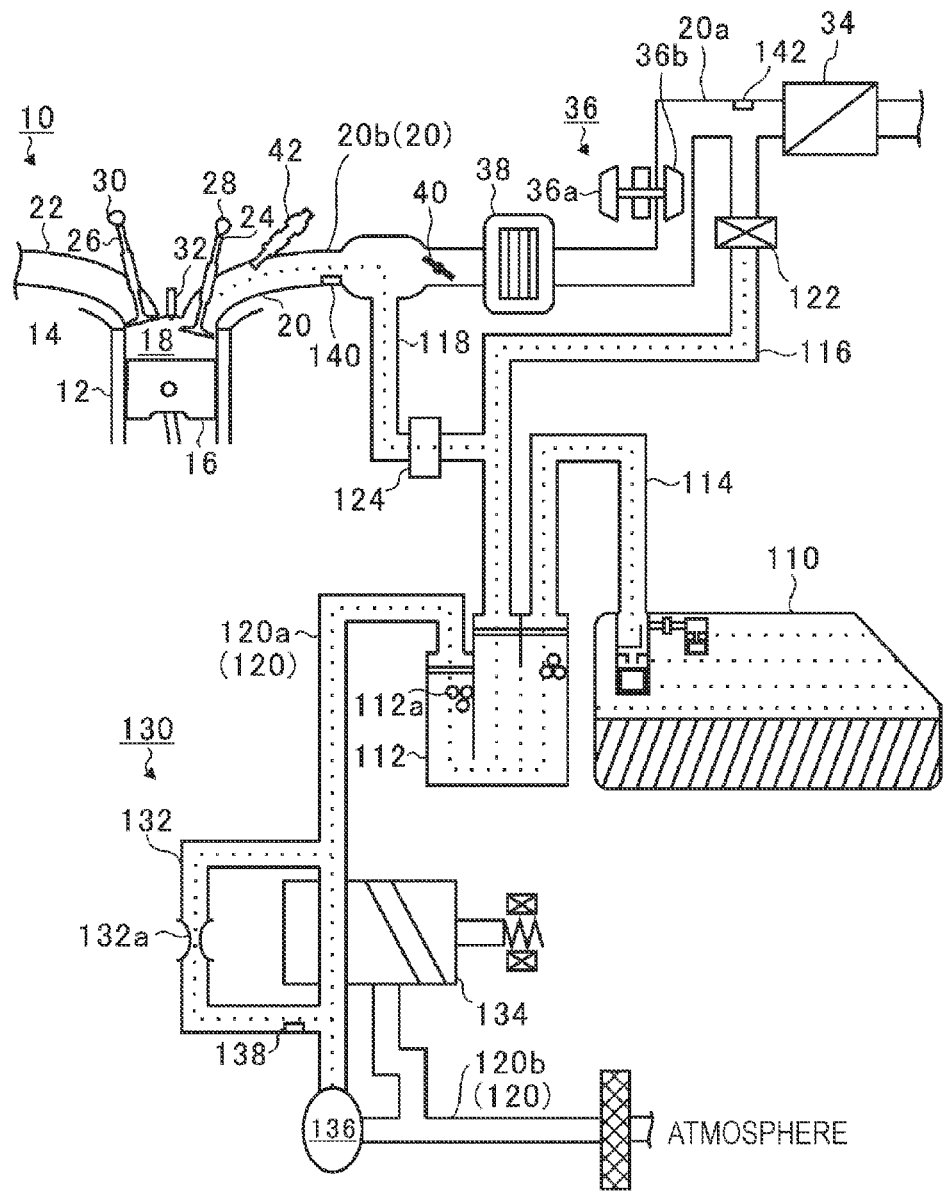
FIG. 4 describes downstream-side purge passage abnormality determination processing.

FIG. 4 describes downstream-side purge passage abnormality determination processing. As mentioned above, when the supercharger 36 is stopped and the pressure in the downstream-side intake passage 20b becomes negative pressure, the valve controller 154 sets the downstream-side valve 124 in the opened state, sets the upstream-side valve 122 in the closed state, and sets the switching valve 134 in the OFF state. The downstream-side purge passage abnormality determination processing is performed in this state.

When downstream-side purge passage abnormality determination processing is started, the valve controller 154 sets the switching valve 134 in the ON state. Consequently, the air in the fuel tank 110, the canister 112 and the vapor passage 114, the air closer to the side of the canister 112 than the upstream-side valve 122 in the upstream-side purge passage 116, and the air in the downstream-side purge passage 118, the gas passage 120 and the bypass passage 132 (hereinafter, these are referred to as a downstream-side-purge-passage-abnormality-determination-processing purge flow) are drawn into the side of the engine 10 because the pressure in the downstream-side intake passage 20b becomes negative pressure.

In the fuel vapor treatment apparatus 100, when the downstream-side-purge-passage-abnormality-determination-processing purge flow has no abnormality (leak), the pressure in the downstream-side-purge-passage-abnormality-determination-processing purge flow is reduced. Meanwhile, when the downstream-side-purge-passage-abnormality-determination-processing purge flow has an abnormality, air flows in from the abnormal portion, and consequently the pressure in the downstream-side-purge-passage-abnormality-determination-processing purge flow is not reduced (or is difficult to reduce).

Thus, when the pressure detected by the first pressure sensor 138 becomes less than or equal to a prescribed downstream pressure threshold within a prescribed period, the abnormality determining module 158 determines that the downstream-side-purge-passage-abnormality-determination-processing purge flow has no abnormality; and when the pressure detected by the first pressure sensor 138 does not become less than or equal to the downstream pressure threshold within the prescribed period, the abnormality determining module 158 determines that the downstream-side-purge-passage-abnormality-determination-processing purge flow has an abnormality.

After that, the valve controller 154 sets the switching valve 134 in the OFF state. When the abnormality determining module 158 determines that the downstream-side-purge-passage-abnormality-determination-processing purge flow has an abnormality, the abnormality determining module 158 reports, on the display provided in the vehicle, that the downstream-side-purge-passage-abnormality-determination-processing purge flow has an abnormality.

Although the downstream-side purge passage abnormality determination processing is performed mainly in order to detect an abnormality of the downstream-side purge passage 118, it is actually determined whether the entire downstream-side-purge-passage-abnormality-determination-processing purge flow has an abnormality.

(Upstream-Side Purge Passage Abnormality Determination Processing)

Figure 5:
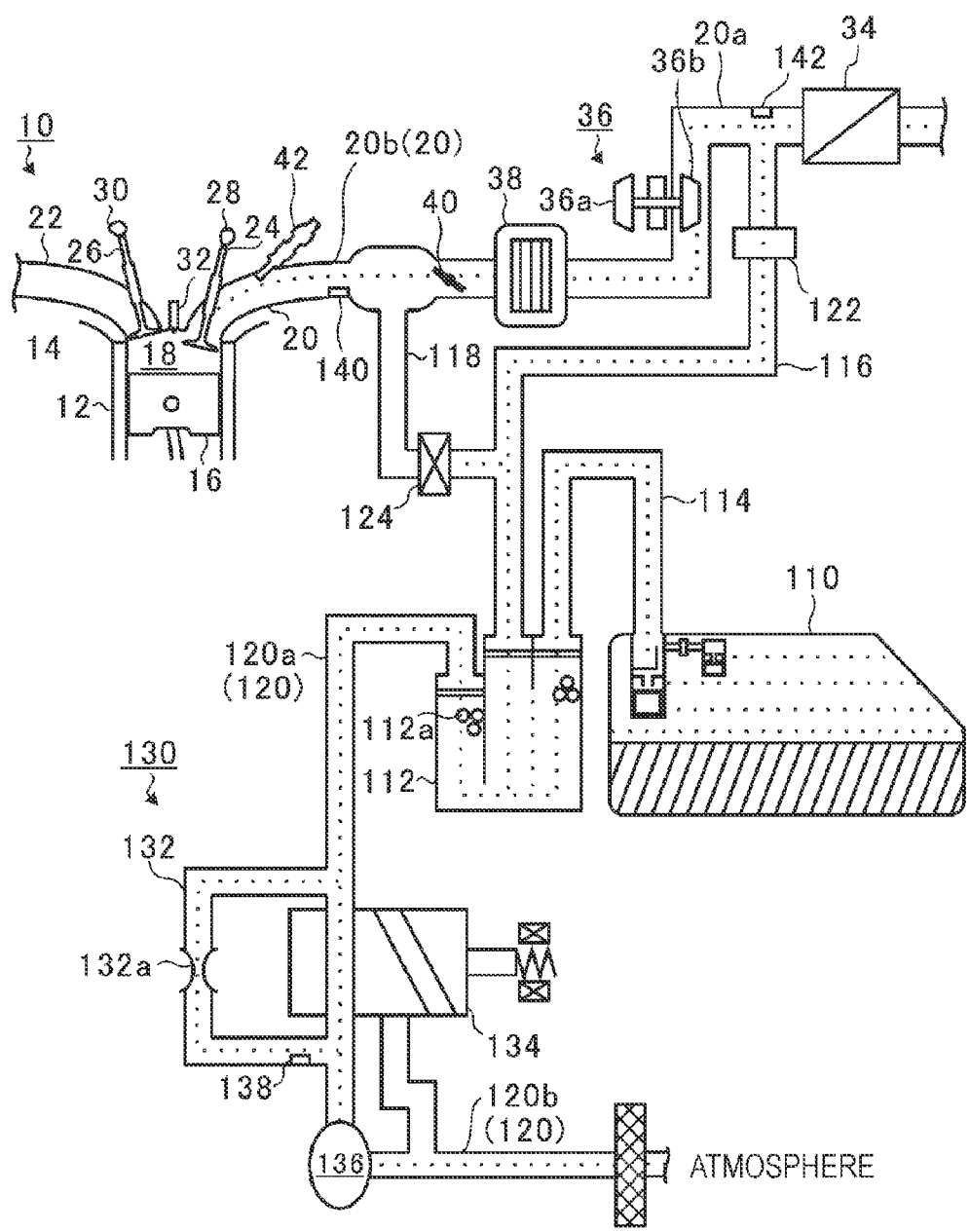
FIG. 5 describes upstream-side purge passage abnormality determination processing.

FIG. 5 describes upstream-side purge passage abnormality determination processing. As mentioned above, when the supercharger 36 is driven and the pressure in the downstream-side intake passage 20b becomes positive pressure, the valve controller 154 sets the downstream-side valve 124 in the closed state, sets the upstream-side valve 122 in the opened state, and sets the switching valve 134 in the OFF state. The upstream-side purge passage abnormality determination processing is performed in this state.

When upstream-side purge passage abnormality determination processing is started, the valve controller 154 sets the switching valve 134 in the ON state. After that, the pump controller 156 drives the pump 136.

Consequently, the air in the fuel tank 110, the canister 112, the vapor passage 114 and the upstream-side purge passage 116, the air closer to the side of the canister 112 than the downstream-side valve 124 in the downstream-side purge passage 118, the air in the gas passage 120 and the bypass passage 132 (hereinafter, these are referred to as an upstream-side-purge-passage-abnormality-determination-processing purge flow) are drawn into the side of the engine 10 due to the negative pressure in the upstream-side intake passage 20a, and are discharged to the atmosphere side by the pump 136.

In the fuel vapor treatment apparatus 100, when the upstream-side-purge-passage-abnormality-determination-processing purge flow has no abnormality (leak), the pressure in the upstream-side-purge-passage-abnormality-determination-processing purge flow is reduced. Meanwhile, when the upstream-side-purge-passage-abnormality-determination-processing purge flow has an abnormality, air flows in from the abnormal portion, and consequently the pressure in the upstream-side-purge-passage-abnormality-determination-processing purge flow is not reduced (or is difficult to reduce).

Thus, when the pressure detected by the first pressure sensor 138 becomes less than or equal to an upstream pressure threshold within a prescribed period, the abnormality determining module 158 determines that the upstream-side-purge-passage-abnormality-determination-processing purge flow has no abnormality; and when the pressure detected by the first pressure sensor 138 does not become less than or equal to the upstream pressure threshold within the prescribed period, the abnormality determining module 158 determines that the upstream-side-purge-passage-abnormality-determination-processing purge flow has an abnormality.

After that, the valve controller 154 sets the switching valve 134 in the OFF state. The pump controller 156 stops the pump 136. When the abnormality determining module 158 determines that the upstream-side-purge-pas sage-abnormality-determination-processing purge flow has an abnormality, the abnormality determining module 158 reports, for example, on the display provided in the vehicle, that the upstream-side-purge-passage-abnormality-determination-processing purge flow has an abnormality.

Although the upstream-side purge passage abnormality determination processing is performed mainly in order to detect an abnormality of the upstream-side purge passage 116, it is actually determined whether the entire upstream-side-purge-passage-abnormality-determination-processing purge flow has an abnormality.

Here, when the supercharger 36 is stopped and the downstream-side intake passage 20b has negative pressure, the pressure in the downstream-side intake passage 20b is low (e.g. −500 mmHg); therefore, in the downstream-side purge passage abnormality determination processing, the air in the downstream-side-purge-passage-abnormality-determination-processing purge flow can be drawn into the side of the engine 10 due to the negative pressure in the downstream-side intake passage 20b, even without operating the pump 136.

When a vane pump is used as the pump 136 as in the implementation, and the pump 136 is stopped, the vane 136g slides with respect to the rotor 136e due to vibration, etc., and consequently the intake port 136b and the exhaust port 136c communicate with each other in some cases. In such a case, air flows from the atmosphere into the downstream-side-purge-passage-abnormality-determination-processing purge flow via the pump 136. However, the pressure in the downstream-side intake passage 20b is low (negative pressure), and then the pressure in the upstream-side-purge-passage-abnormality-determination-processing purge flow decreases even if air flows into the upstream-side-purge-passage-abnormality-determination-processing purge flow via the pump 136. Accordingly, it is possible to detect an abnormality of the upstream-side-purge-passage-abnormality-determination-processing purge flow on the basis of the pressure in the upstream-side-purge-passage-abnormality-determination-processing purge flow.

Meanwhile, when the supercharger 36 is driven, the upstream-side intake passage 20a has negative pressure, but the pressure in the upstream-side intake passage 20a has only a slight negative pressure of −7 mmHg, for example. Therefore, in the upstream-side purge passage abnormality determination processing, when the intake port 136b and the exhaust port 136c of the pump 136 communicate, there is no discharging the air in the upstream-side-purge-passage-abnormality-determination-processing purge flow sufficiently (there is no producing a change in pressure to the extent to which the abnormality can be detected).

Thus, in the upstream-side purge passage abnormality determination processing, the pump 136 is driven to bring the vane 136g into contact with the inner side surface of the cam ring 136a, and to block the intake port 136b and the exhaust port 136c. Therefore, it is possible at least to prevent air from flowing from the atmosphere into the upstream-side-purge-passage-abnormality-determination-processing purge flow via the pump 136, and to reduce the pressure in the upstream-side-purge-passage-abnormality-determination-processing purge flow to the extent to which the abnormality can be detected. Furthermore, by driving the pump 136 and discharging the air in the upstream-side-purge-passage-abnormality-determination-processing purge flow to the side of the engine 10 and the atmosphere using the negative pressure in the upstream-side intake passage 20a and the pump 136, the rate at which the pressure in the upstream-side-purge-passage-abnormality-determination-processing purge flow decreases can be increased.

Figure 6:
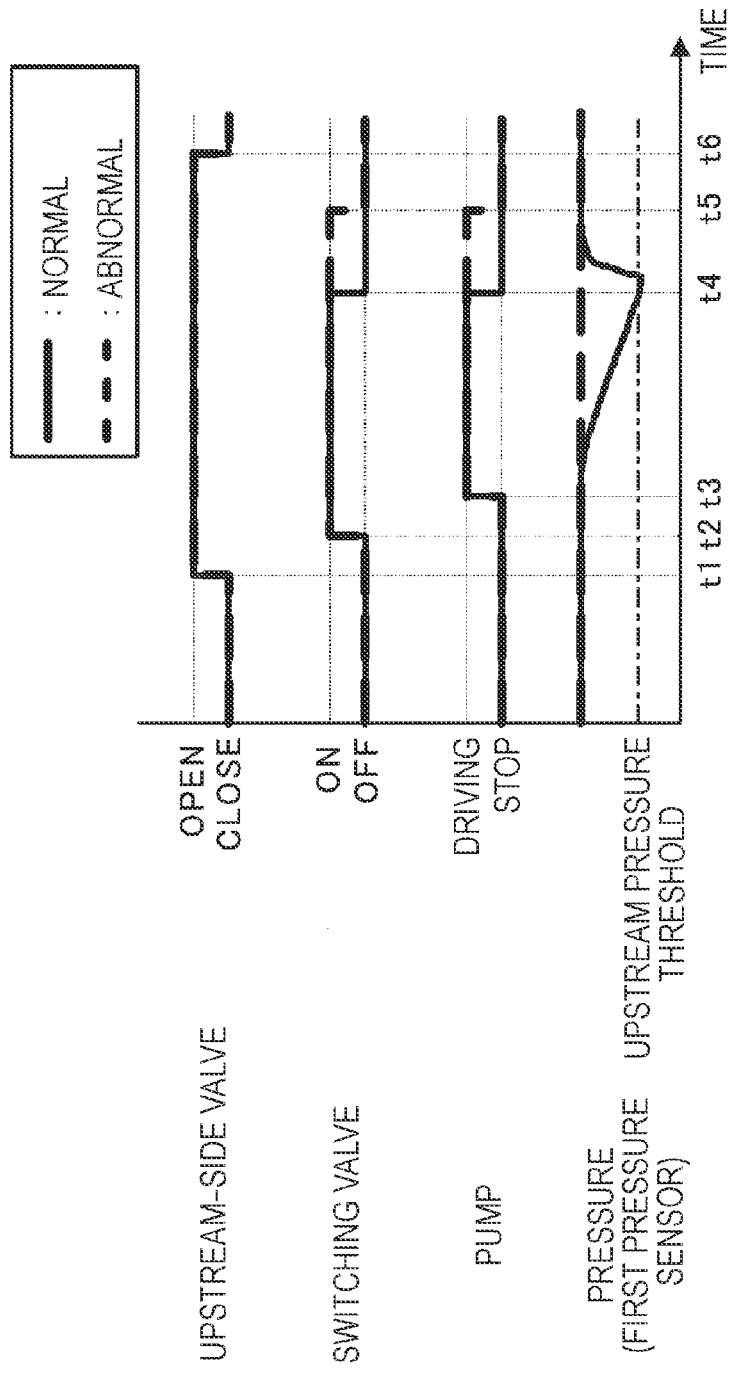
FIG. 6 is a time chart of upstream-side purge passage abnormality determination processing.

FIG. 6 is a time chart of the upstream-side purge passage abnormality determination processing. FIG. 6 illustrates the transitions of the states of the upstream-side valve 122, the switching valve 134 and the pump 136, and the pressure detected by the first pressure sensor 138. The solid line illustrates the state of the normal upstream-side purge passage 116, the broken line illustrates the state of the abnormal upstream-side purge passage 116 (upstream-side-purge-passage-abnormality-determination-processing purge flow), and the alternate long and short dash line illustrates the upstream pressure threshold used for the abnormality determining module 158 to determine whether the upstream-side purge passage 116 (upstream-side-purge-passage-abnormality-determination-processing purge flow) has an abnormality.

As described above, first, when the pressure in the downstream-side intake passage 20b becomes positive pressure, the upstream-side valve 122 is switched from the closed state (CLOSE) to the opened state (OPEN) (t1). Next, the switching valve 134 is switched from the OFF state to the ON state (t2). Subsequently, the pump 136 is driven (t3).

Consequently, the pressure in the upstream-side-purge-passage-abnormality-determination-processing purge flow detected by the first pressure sensor 138 decreases gradually; and when the pressure is reduced to less than or equal to the upstream pressure threshold (in the drawing, the alternate long and short dash line), it is determined that the upstream-side-purge-passage-abnormality-determination-processing purge flow has no abnormality (normal). Then, by switching the switching valve 134 to the OFF state, and stopping the pump 136, the upstream-side purge passage abnormality determination processing is finished (t4). When the pressure in the downstream-side intake passage 20b becomes negative pressure, the upstream-side valve 122 is set in the closed state (CLOSE) (t6).

Meanwhile, when the pressure in the upstream-side-purge-passage-abnormality-determination-processing purge flow detected by the first pressure sensor 138 does not fluctuate or is not reduced to less than or equal to the upstream pressure threshold within the prescribed period, the abnormality determining module determines that the upstream-side-purge-passage-abnormality-determination-processing purge flow is abnormal. After that, by switching the switching valve 134 to the OFF state, and stopping the pump 136, the upstream-side purge passage abnormality determination processing is finished (t5). After the upstream-side purge passage abnormality determination processing is finished, the upstream-side valve 122 is timely set in the closed state (CLOSE) (t6).

Figure 7:
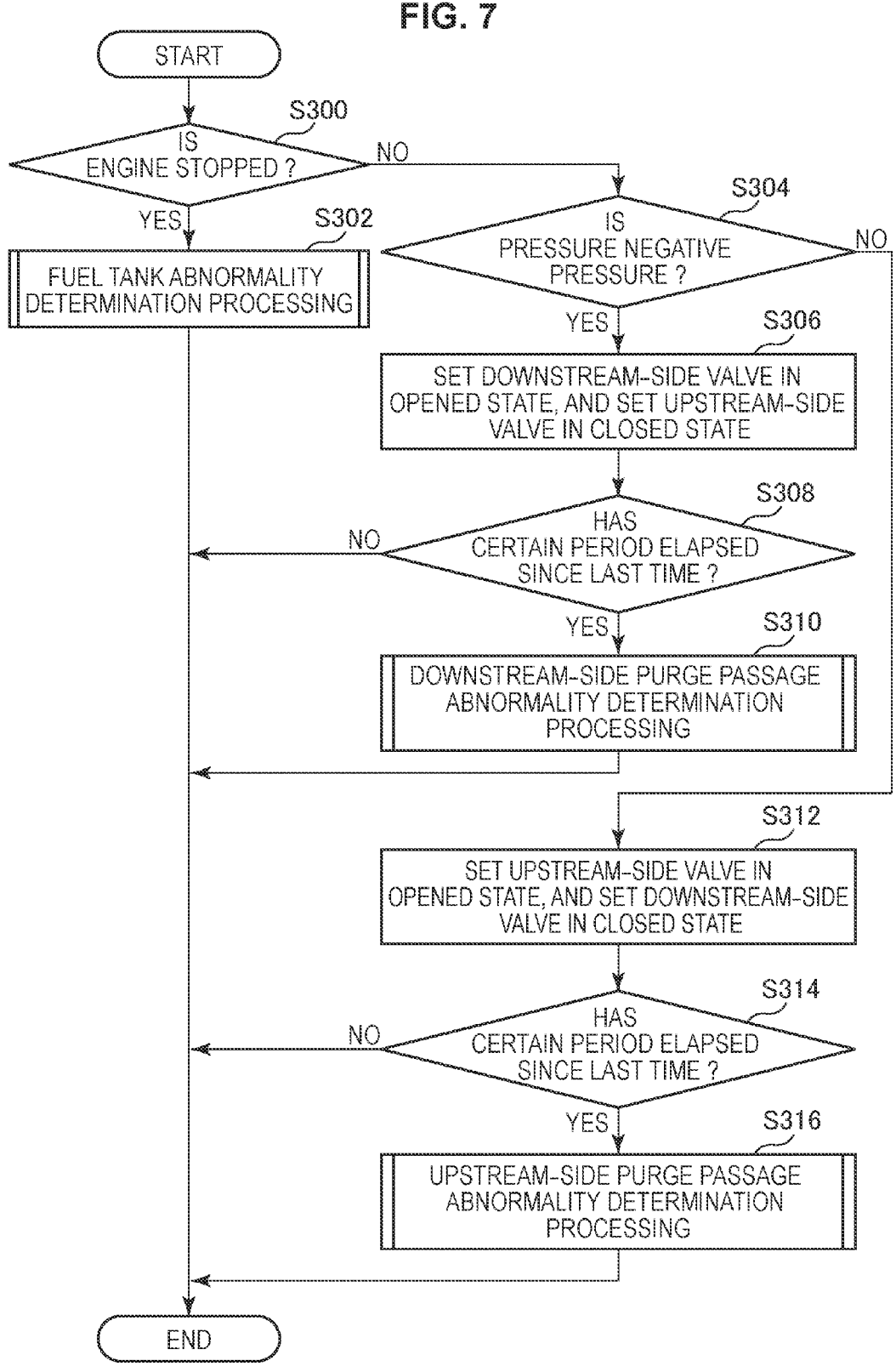
FIG. 7 is a flowchart illustrating fuel vapor treatment.

FIG. 7 is a flowchart illustrating fuel vapor treatment. As illustrated in FIG. 7, the drive controller 152 determines whether the engine 10 is stopped (S300). When it is determined that the engine 10 is stopped (YES in S300), the ECU 150 performs fuel tank abnormality determination processing (S302), which is described later in detail, and finishes the fuel vapor treatment.

When it is determined that the engine 10 is not stopped (but driven) (NO in S300), the valve controller 154 determines whether the supercharger 36 is stopped and the pressure in the downstream-side intake passage 20b is negative pressure (S304).

When it is determined that the pressure in the downstream-side intake passage 20b is negative pressure (YES in S304), the valve controller 154 sets the downstream-side valve 124 in the opened state, and sets the upstream-side valve 122 in the closed state (S306). Thereby, the fuel vapor in the canister 112 is purged due to the negative pressure in the downstream-side intake passage 20b, and the fuel vapor is supplied to the engine 10 (combustion chamber 18) via the downstream-side intake passage 20b.

Then, the valve controller 154 determines whether a certain period has elapsed since the last downstream-side purge passage abnormality determination processing (S308). When it is determined as a result that the certain period has elapsed (YES in S308), the valve controller 154 performs downstream-side purge passage abnormality determination processing (S310), which is described later in detail, and finishes the fuel vapor treatment. When the valve controller 154 determines that the certain period has not elapsed (NO in S308), the valve controller 154 finishes the fuel vapor treatment. If a prescribed time has elapsed since the last downstream-side purge passage abnormality determination processing, or if the engine 10 has been started prescribed times since the last downstream-side purge passage abnormality determination processing, it may be considered that the certain period has elapsed.

Meanwhile, when it is determined that the pressure in the downstream-side intake passage 20b is not negative pressure (but positive pressure) (NO in S304), the upstream-side valve 122 is set in the opened state, and the downstream-side valve 124 is set in the closed state (S312). Thereby, the fuel vapor in the canister 112 is purged due to the negative pressure in the upstream-side intake passage 20a, and the fuel vapor is supplied to the engine 10 (combustion chamber 18) via the upstream-side intake passage 20a.

Then, the valve controller 154 determines whether a certain period has elapsed since the last upstream-side purge passage abnormality determination processing (S314). When it is determined as a result that the certain period has elapsed (YES in S314), the valve controller 154 performs upstream-side purge passage abnormality determination processing (S316), which is described later in detail, and finishes the fuel vapor treatment. When the valve controller 154 determines that the certain period has not elapsed (NO in S314), the valve controller 154 finishes the fuel vapor treatment. If a prescribed time has elapsed since the last upstream-side purge passage abnormality determination processing, or if the engine 10 has been started prescribed times since the last upstream-side purge passage abnormality determination processing, it may be considered that the certain period has elapsed.

Figure 8:
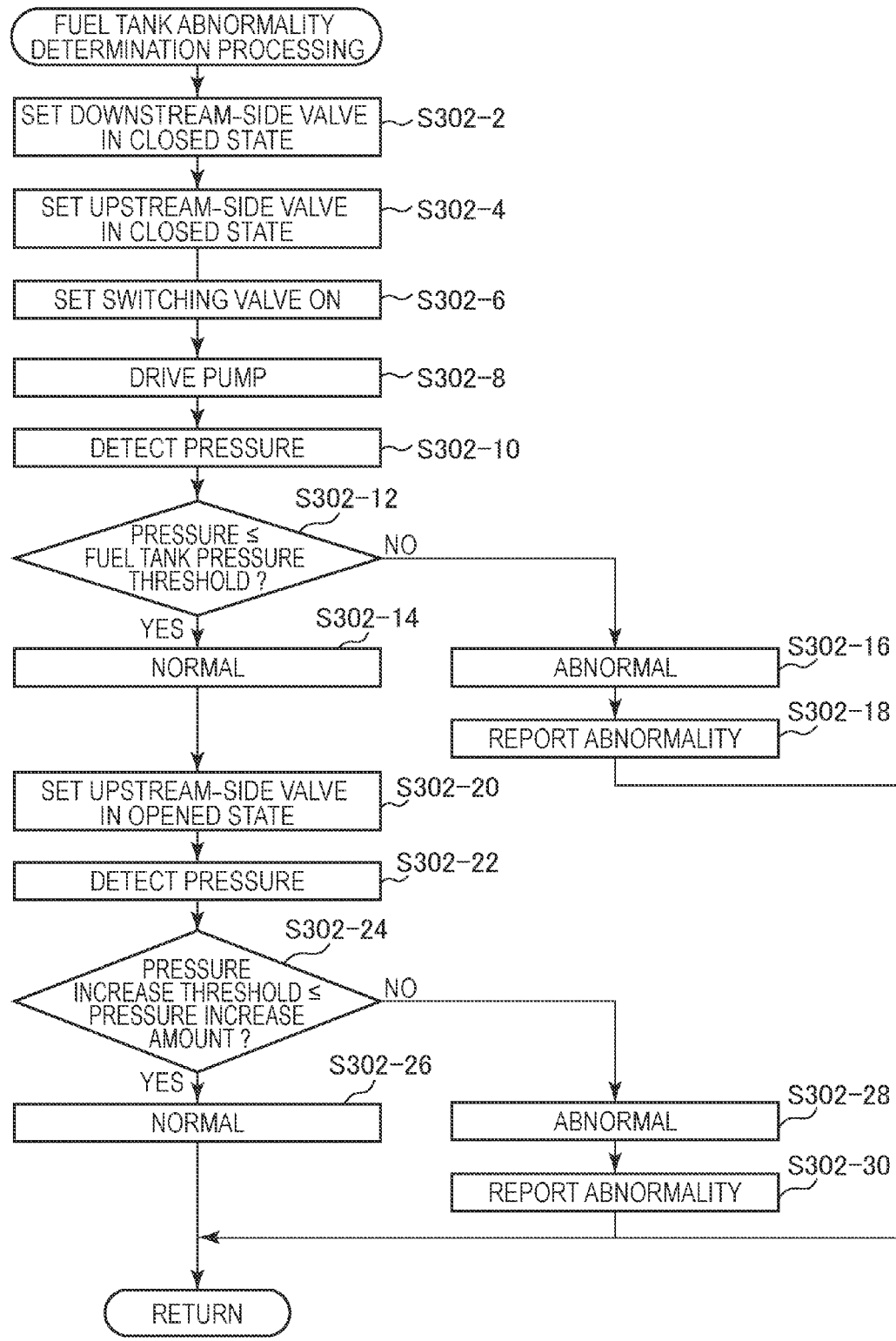
FIG. 8 is a flowchart illustrating fuel tank abnormality determination processing.

FIG. 8 is a flowchart illustrating fuel tank abnormality determination processing. As illustrated in FIG. 8, first, when fuel tank abnormality determination processing is started, the valve controller 154 sets the downstream-side valve 124 in the closed state (S302-2), sets the upstream-side valve 122 in the closed state (S302-4), and sets the switching valve 134 in the ON state (S302-6).

Subsequently, the pump controller 156 drives the pump 136 (S302-8), and discharges the air in the fuel-tank-abnormality-determination-processing purge flow. Next, the first pressure sensor 138 detects the pressure in the fuel-tank-abnormality-determination-processing purge flow over a prescribed period (S302-10).

After that, the abnormality determining module 158 determines whether the pressure detected by the first pressure sensor 138 becomes less than or equal to the fuel tank pressure threshold (S302-12). When it is determined as a result that the pressure becomes less than or equal to the fuel tank pressure threshold (YES in S302-12), it is determined that the fuel tank 110 is normal (S302-14), and the flow proceeds to the next processing. When the abnormality determining module 158 determines that the pressure does not become less than or equal to the fuel tank pressure threshold (NO in S302-12), the abnormality determining module 158 determines that the fuel tank 110 is abnormal (S302-16). On determining an abnormality of the fuel tank 110, the abnormality determining module 158 reports, on the display, the abnormality of the fuel-tank-abnormality-determination-processing purge flow (S302-18), and finishes the fuel tank abnormality determination processing.

Next, when it is determined that the fuel tank 110 is normal, the valve controller 154 switches the upstream-side valve 122 from the closed state to the opened state with the switching valve 134 in the ON state and the pump 136 driven (S302-20), and the first pressure sensor 138 detects the pressure in the fuel-tank-abnormality-determination-processing purge flow over a prescribed period (S302-22).

After that, the abnormality determining module 158 determines whether the pressure increase amount becomes greater than or equal to the pressure increase threshold (S302-24). When it is determined as a result that the pressure increase amount becomes greater than or equal to the pressure increase threshold (YES in S302-24), the abnormality determining module 158 determines that the fuel-tank-abnormality-determination-processing purge flow is normal (S302-26), and finishes the fuel tank abnormality determination processing.

When the abnormality determining module 158 determines that the pressure increase amount does not become greater than or equal to the pressure increase threshold (NO in S302-24), the abnormality determining module 158 determines that the fuel-tank-abnormality-determination-processing purge flow is abnormal (S302-28). On determining an abnormality of the fuel-tank-abnormality-determination-processing purge flow, the abnormality determining module 158 reports, on the display, the abnormality of the fuel-tank-abnormality-determination-processing purge flow (S302-30), and finishes the fuel tank abnormality determination processing.

When the fuel tank abnormality determination processing is finished, the upstream-side valve 122 and the downstream-side valve 124 are set in the opened state, the switching valve 134 is set in the OFF state, and the pump 136 is stopped.

Figure 9:
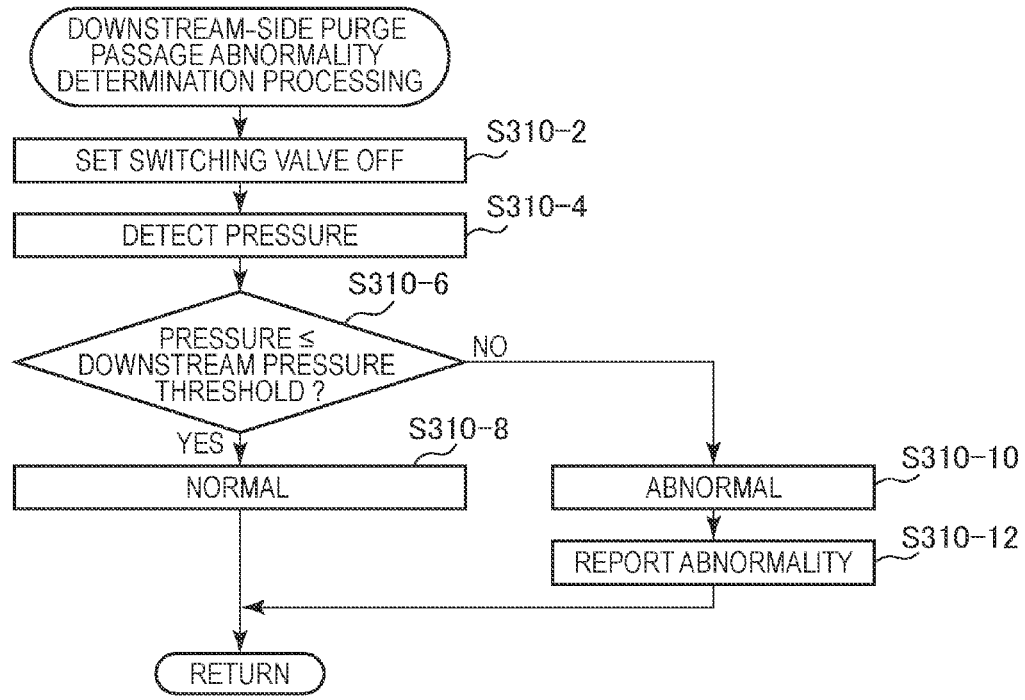
FIG. 9 is a flowchart illustrating downstream-side purge passage abnormality determination processing.

FIG. 9 is a flowchart illustrating downstream-side purge passage abnormality determination processing. As illustrated in FIG. 9, first, when downstream-side purge passage abnormality determination processing is started, the valve controller 154 switches the switching valve 134 to the OFF state (S310-2). Consequently, the air in the downstream-side-purge-passage-abnormality-determination-processing purge flow is drawn into the side of the engine 10 due to the pressure (negative pressure) in the downstream-side intake passage 20b. After that, the first pressure sensor 138 detects the pressure in the downstream-side-purge-passage-abnormality-determination-processing purge flow over a prescribed period (S310-4).

The abnormality determining module 158 determines whether the pressure detected by the first pressure sensor 138 becomes less than or equal to the downstream pressure threshold (S310-6). When the abnormality determining module 158 determines as a result that the pressure becomes less than or equal to the downstream pressure threshold (YES in S310-6), the abnormality determining module 158 determines that the downstream-side-purge-passage-abnormality-determination-processing purge flow is normal (S310-8), and finishes the downstream-side purge passage abnormality determination processing. When the abnormality determining module 158 determines that the pressure detected by the first pressure sensor 138 does not become less than or equal to the downstream pressure threshold (NO in S310-6), the abnormality determining module 158 determines that the downstream-side-purge-passage-abnormality-determination-processing purge flow has an abnormality (S310-10). On determining that the downstream-side-purge-passage-abnormality-determination-processing purge flow has an abnormality, the abnormality determining module 158 reports, on the display, the abnormality of the downstream-side-purge-passage-abnormality-determination-processing purge flow (S310-12), and finishes the downstream-side purge passage abnormality determination processing.

Figure 10:
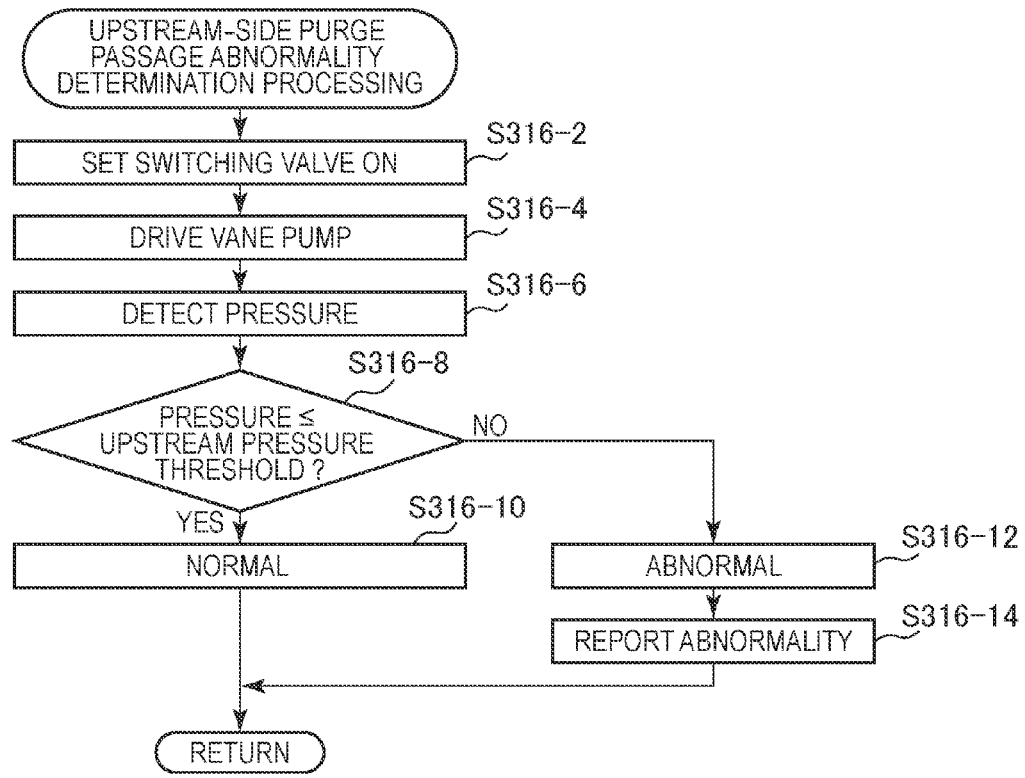
FIG. 10 is a flowchart illustrating upstream-side purge passage abnormality determination processing.

FIG. 10 is a flowchart illustrating upstream-side purge passage abnormality determination processing. As illustrated in FIG. 10, first, when upstream-side purge passage abnormality determination processing is started, the valve controller 154 switches the switching valve 134 to the ON state (S316-2). Next, the pump controller 156 drives the pump 136 (S316-4).

The air in the upstream-side-purge-passage-abnormality-determination-processing purge flow is discharged to the side of the engine 10 and the atmosphere side by the pressure (negative pressure) in the upstream-side intake passage 20a and the pump 136.

Next, the first pressure sensor 138 detects the pressure in the upstream-side-purge-passage-abnormality-determination-processing purge flow over a prescribed period (S316-6). Next, the abnormality determining module 158 determines whether the pressure detected by the first pressure sensor 138 becomes less than or equal to the upstream pressure threshold (S316-8). When the abnormality determining module 158 determines as a result that the pressure detected by the first pressure sensor 138 becomes less than or equal to the upstream pressure threshold (YES in S316-8), the abnormality determining module 158 determines that the upstream-side-purge-passage-abnormality-determination-processing purge flow is normal (S316-10), and finishes the upstream-side purge passage abnormality determination processing. When the abnormality determining module 158 determines that the pressure does not become less than or equal to the upstream pressure threshold (NO in S316-8), the abnormality determining module 158 determines that the upstream-side-purge-passage-abnormality-determination-processing purge flow is abnormal (S316-12). On determining that the upstream-side-purge-passage-abnormality-determination-processing purge flow has an abnormality, the abnormality determining module 158 reports, on the display, the abnormality of the upstream-side-purge-passage-abnormality-determination-processing purge flow (S316-14), and finishes the upstream-side purge passage abnormality determination processing. At the time of finishing the upstream-side purge passage abnormality determination processing, the switching valve 134 is set in the OFF state, and the pump 136 is stopped.

Although the preferred implementation of the present invention has been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

In the implementation described above, when upstream-side purge passage abnormality determination processing is performed, the first pressure sensor 138 detects the pressure with the pump 136 driven by the pump controller 156; but the implementation is not limited thereto. When upstream-side purge passage abnormality determination processing is performed or before upstream-side purge passage abnormality determination processing is performed, the pump controller 156 may drive the pump 136 at least until the vane 136g comes into contact with the inner side surface 136d of the cam ring 136a and then the pump 136 may be stopped. The abnormality determining module 158 may determine whether the upstream-side-purge-passage-abnormality-determination-processing purge flow has an abnormality, on the basis of the pressure detected by the first pressure sensor 138 after the pump 136 is stopped.

In this way, when the intake port 136b and the exhaust port 136c are blocked by driving the pump 136 at least until the vane 136g comes into contact with the inner side surface 136d of the cam ring 136a, the pressure in the upstream-side-purge-passage-abnormality-determination-processing purge flow can be reduced to the extent to which an abnormality can be detected using only the negative pressure in the upstream-side intake passage 20a. However, there is no avoiding a decrease in the rate at which the pressure in the upstream-side-purge-passage-abnormality-determination-processing purge flow decreases, by using the negative pressure in the upstream-side intake passage 20a alone. Accordingly, keeping the pump 136 driven can help increase the rate at which the pressure in the upstream-side-purge-passage-abnormality-determination-processing purge flow decreases, and detect an abnormality earlier.

In the implementation described above, the valve controller 154 switches the opened and closed states of the upstream-side valve 122 and the downstream-side valve 124; but the implementation is not limited thereto. The upstream-side valve 122 and the downstream-side valve 124 may use a structure of a check valve, etc., and may be opened and closed on the basis of the pressure at the positions where they are provided.

INDUSTRIAL APPLICABILITY

The present invention can be used for a fuel vapor treatment apparatus that treats fuel vapor generated in a fuel tank.

The invention claimed is:
1. A fuel vapor treatment apparatus of a vehicle in which a supercharger that supercharges an intake air is provided at an intake passage of an internal combustion engine, the fuel vapor treatment apparatus comprising:
a canister that communicates with a fuel tank via a vapor passage and causes a fuel vapor generated from the fuel tank to be adsorbed;
an upstream-side purge passage that provides a communication between an upstream-side intake passage on an upstream side of the supercharger in the intake passage and the canister;
a downstream-side purge passage that provides a communication between a downstream-side intake passage on a downstream side of the supercharger in the intake passage and the canister;
an upstream-side valve that is provided at the upstream-side purge passage, enters an opened state for allowing the upstream-side purge passage to communicate when a pressure in the upstream-side intake passage becomes a negative pressure, and enters a closed state for closing the upstream-side purge passage when the pressure in the upstream-side intake passage becomes a positive pressure;
a downstream-side valve that is provided at the downstream-side purge passage, enters an opened state for allowing the downstream-side purge passage to communicate when a pressure in the downstream-side intake passage becomes a negative pressure, and enters a closed state for closing the downstream-side purge passage when the pressure in the downstream-side intake passage becomes a positive pressure;
a gas passage one end of which is opened to an atmosphere and another end of which is connected with the canister;
a pump that is provided at the gas passage and takes in an air on a side of the canister in the gas passage;
a pump controller that is configured to drive the pump;
a gas passage pressure detector that is provided between the canister and the pump in the gas passage and is configured to detect a pressure in the gas passage; and
an abnormality determining module that is configured to determine whether one or both of the upstream-side purge passage and the downstream-side purge passage has an abnormality, based on the pressure detected by the gas passage pressure detector,
wherein the abnormality determining module is further configured to determine whether the upstream-side purge passage has an abnormality, based on the pressure detected by the gas passage pressure detector after the upstream-side valve enters the opened state and the pump is driven by the pump controller, and wherein the abnormality determining module is further configured to determine whether the downstream-side purge passage has an abnormality, based on the pressure detected by the gas passage pressure detector when the downstream-side valve enters the opened state and the pump remains undriven.

2. The fuel vapor treatment apparatus according to claim 1, wherein the pump is a vane pump in which a rotor is provided eccentrically with respect to a cam ring, a vane that is provided slidably in a trench formed on the rotor protrudes due to a centrifugal force caused by a rotation of the rotor, and the rotor is rotated in contact with an inner side surface of the cam ring, wherein the pump controller rotates the rotor until the vane comes into contact with the inner side surface of the cam ring so as to block an intake port and an exhaust port when the abnormality determining module determines that the upstream-side purge passage has an abnormality or before the abnormality determining module determines that the upstream-side purge passage has an abnormality, after the upstream-side valve enters the opened state, and wherein the abnormality determining module is further configured to determine whether the upstream-side purge passage has an abnormality, based on the pressure detected by the gas passage pressure detector in a state where the upstream-side valve enters the opened state and the intake port and an exhaust port are blocked from each other.

* * * * *